July 1, 1930.  C. I. McGEE  1,769,705

COMBINED NUT AND WASHER

Filed June 9, 1925

INVENTOR
Charles I. McGee
BY
J. W. Ellis
ATTORNEY

Patented July 1, 1930

1,769,705

UNITED STATES PATENT OFFICE

CHARLES I. McGEE, OF BUFFALO, NEW YORK, ASSIGNOR, BY DIRECT AND MESNE ASSIGNMENTS, TO McKAIG-HATCH, INC., A CORPORATION OF NEW YORK

COMBINED NUT AND WASHER

Application filed June 9, 1925. Serial No. 36,058.

It is well known to those skilled in the art that transmission bands used in the Ford automobile may now be assembled without having to dismantle the transmission housing, but difficulty is experienced in placing the conventional nut and washer upon the bolt of the transmission band. There is also great danger of the workman dropping the washer or nut into the transmission during the attempt to pass the washer over the bolt and engage the screw threads of the nut with those of the bolt, the dropping of either of which would necessitate the disassembling of the transmission in order to recover the lost part, which must be removed to avoid damage to parts of the transmission.

An object of my invention has been to combine a nut and washer in such a manner that it will be necessary to handle only one piece instead of two, as is now customary.

Another object has been to provide means to permit the temporary attachment of a wire or string to the combined nut and washer, whereby, if the same is dropped, it may be recovered by means of such wire or string.

Other objects have been to provide an accessory which will be simple and inexpensive to manufacture, and one sturdy and durable in construction.

The above objects and advantages have been accomplished by the device shown in the accompanying drawings, of which:

Figure 1:
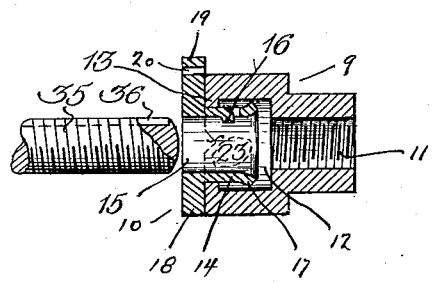
Fig. 1 is a transverse, sectional view of my complete device, showing a portion of the bolt with which it is used.

As shown in the drawings, my device comprises a nut 9 and a washer 10. The bore of the nut is provided with interior screw threads 11, which screw onto the transmission band bolt 35. The nut is also provided with a counterbore or recess 12 and with an inwardly extending retainer flange 13 at the outer end of said counterbore or recess.

The washer 10 includes in its construction a disk portion 18 of a diameter larger than the counterbore or recess in said nut, and a sleeve extension 14 co-axial therewith and of smaller diameter than said counterbore, said sleeve extension having a bore 15 through which the bolt 35 of the transmission band slips. A key 16, preferably punched out of the metal of said sleeve extension 14, projects into the bore 15 at a point between its ends and engages with a keyway 36 formed in the bolt 35, whereby the washer will be permitted to move endwise on the bolt but is prevented from rotating upon it. The sleeve extension 14 of the washer is disposed within the counterbore or recess 12 of the nut and the inner end of the sleeve extension 14 is flared or bent outwardly as at 17, which inner end so fashioned co-operates with the retainer flange 13 and prevents the complete separation of the nut from the washer, since in the attempt to do so, the flared or outwardly bent portion 17 at the inner end of the sleeve extension would engage said retainer flange and thus stop relative movement lengthwise of the nut and washer. It is therefore apparent that the nut and washer have a limited lengthwise movement relatively, and when both are applied to a bolt, the nut is rotatable on the washer, due to the fact that the key 16 of the washer is entered in the keyway 36 of the bolt. In the act of securing the combined nut and washer to a bolt, the washer can be slid onto the bolt and the key 16 of the washer entered into the keyway 36 of the bolt, and during this step the nut is free to rotate and move lengthwise on the sleeve extension of the washer so that the threaded bore 11 of the nut can be brought into alinement with the bolt so as to permit the nut to be threaded onto the bolt, due to the independent rotative movement allowed the nut. When the nut is tightened on the bolt the flanged end of said nut will engage the washer and crowd the washer firmly against the object tightened by the bolt.

The washer 10 has its disc portion 18 provided with an ear 19. This ear is formed with a perforation 20, through which a wire or string may be passed.

Figure 2:
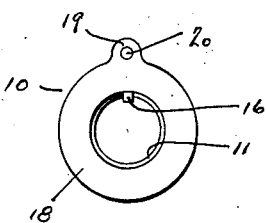
Fig. 2 is a face view of the washer end thereof.
Figure 3:
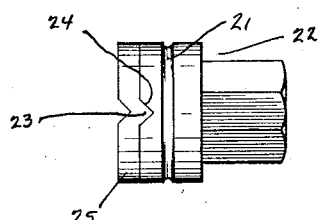
Fig. 3 is a side elevation of a modified form of the invention.

In the form of invention shown in Fig. 3, an annular groove 21 is formed in the nut 22 with which a string or wire may be engaged, for holding the nut and washer while it is being assembled on the transmission band bolt. It is obvious that a string or wire will permit the nut to freely rotate while it is being held thereby. The washer 25 in this form of device need not be provided with the ear 19 shown in Fig. 2.

My device is preferably provided with a locking feature which may comprise ridges 23 provided on the washer, and engaging with co-acting notches 24, formed on the adjacent face of the nut. These ridges and notches are shown exaggerated in size and do not serve as locking means until the nut is almost tightened; therefore, until such a condition exists, the nut is freely rotatable on the sleeve extension of the washer, and even after the parts of this locking means are brought into co-action, or the ridges 23 are in contact with the adjacent end of the nut, the nut is still forcibly rotatable on the washer, due to the fact that the washer is held against rotation on the bolt.

Figure 4:
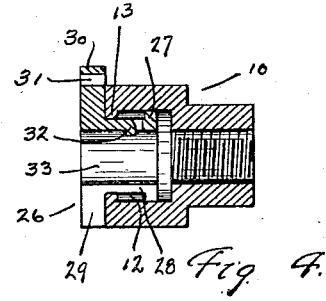
Fig 4 is a transverse, longitudinal, sectional view of a slight modification of the form shown in Fig. 1.
Figure 5:
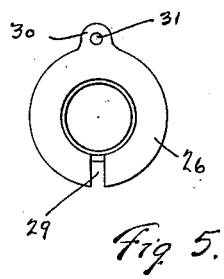
Fig. 5 is an end view of the form shown in Fig. 4.

In the form of invention shown in Figs. 4 and 5, the washer 26 is provided with an integral flange or collar 27, formed on the sleeve extension 28 entered in the counterbore or recess 12 of the nut; this flange or collar being included in the term "flared" in the claims thereof. In order to assemble this form of device, the washer is provided with a slot 29 which permits the sleeve extension with its collar 27 to be contracted sufficiently to pass over the flange 13 of the nut, after which it is sprung back to its normal position, in which position the washer will be rotatably attached to the nut. The washer in this device is preferably provided with the ear 30 having the aperture 31. A key 32 is also provided and extends into the bore 33 of the washer, more particularly into the sleeve extension.

When my device is to be used, a wire or string is preferably attached to the ears 19 or 30 in the forms of invention shown in Figs. 1, 2, 4, and 5, or is placed within the groove 21 of the form of invention shown in Fig. 3. The free end of the wire or string is then suitably secured to some fixed part of the transmission, or is held by the workman, while the combined nut and washer is assembled on the bolt of the transmission band. It is obvious that, should the workman accidentally drop the washer and nut in the act of assembling, even though the same does drop into the transmission of the automobile, it may easily be recovered by drawing it out of the transmission by means of the wire or string previously attached thereto.

Obviously, some modifications of the details herein shown and described may be made without departing from the spirit of my invention or the scope of the appended claims, the form herein shown and described being merely a preferred form, and I do not, therefore, wish to be limited to the exact embodiment of the form herein shown and described.

Having thus described my invention, what I claim is:

1. The combination with a bolt having a keyway, of a nut having a screw-threaded bore and a counterbore provided with a retainer flange at its outer end, and a washer having a disk portion provided with an outstanding perforated ear for attachment thereto of a wire and a sleeve extension of smaller diameter than said disk portion and co-axial therewith, said sleeve extension being entered in said counterbore and flared at its inner end and having a key punched inwardly therefrom between its flared inner end and said disk portion, said key being entered in said keyway and said nut being rotatable and lengthwise movable on said sleeve extension but being held against separation from said washer by the flared inner end of said sleeve extension engaging said retainer flange.

2. A combined nut and washer, comprising a nut having a screw-threaded bore and a counterbore provided at its outer end with an inwardly-directed retainer flange, a washer of larger diameter than said counterbore having a sleeve extension entered into said counterbore and having its inner end flared to prevent separation of said nut from said washer, said nut being rotatable and lengthwise movable on said sleeve extension and said sleeve extension having a key punched inwardly at a point between the ends thereof adapted for co-action with a portion of a bolt, means on said combined nut and washer for securing a wire thereto in a manner to allow rotation of said nut on said washer, the opposed faces of said nut and washer having a notch and ridge adapted to co-act and lock the washer to said nut when the nut is tightened against said washer.

In testimony whereof, I have hereunto signed my name.

CHARLES I. McGEE.